Jan. 12, 1932.  J. J. SCHMIDT ET AL  1,840,533
POWER SAW AND DRILL
Filed Aug. 5, 1930  4 Sheets-Sheet 1
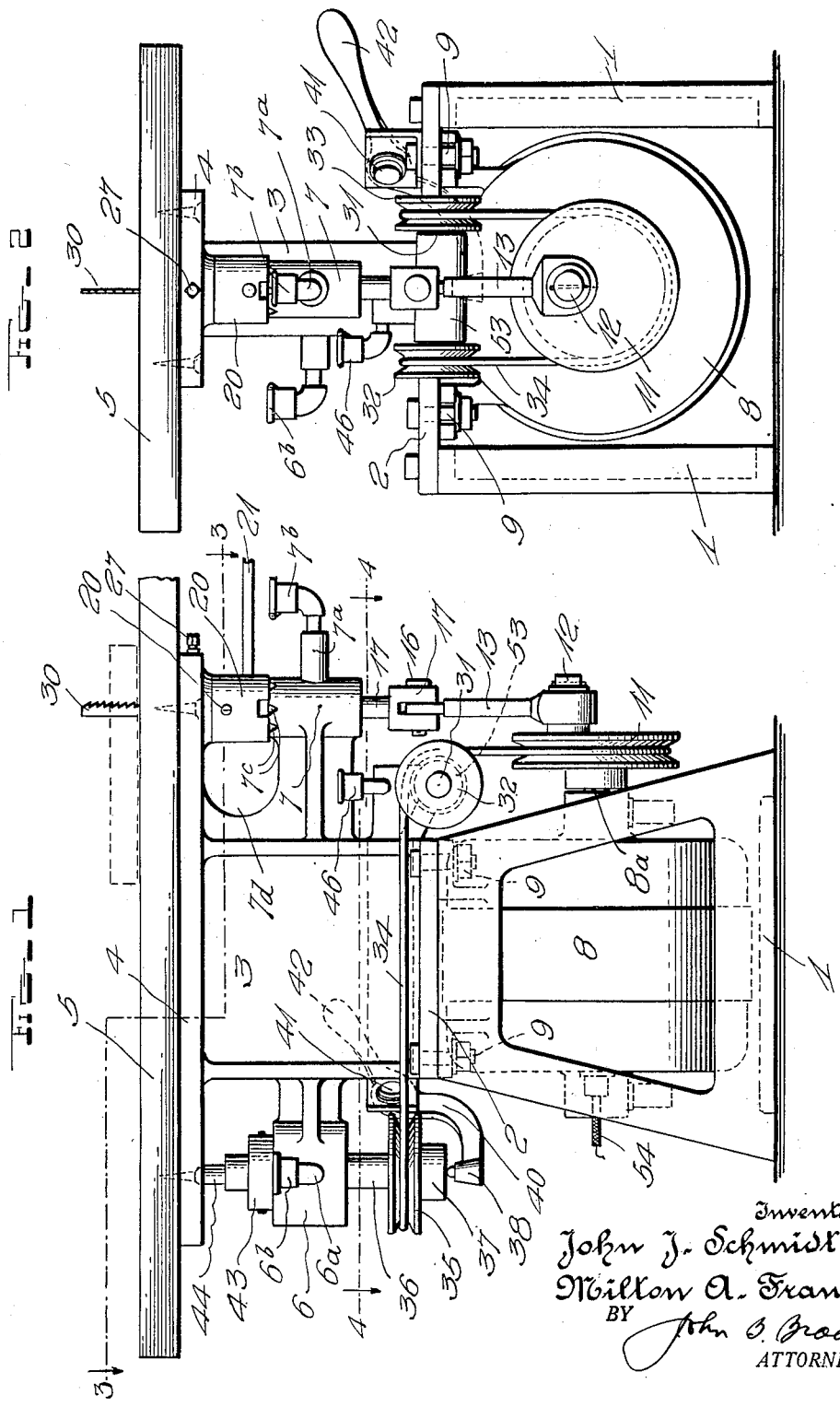
Inventors
John J. Schmidt,
Milton A. Frank,
BY John O. Brady
ATTORNEY

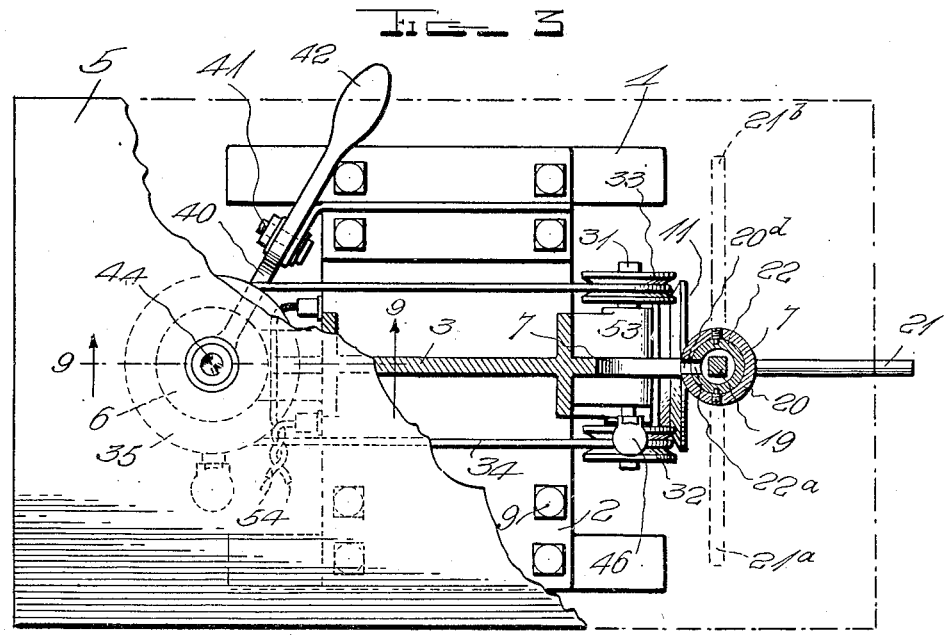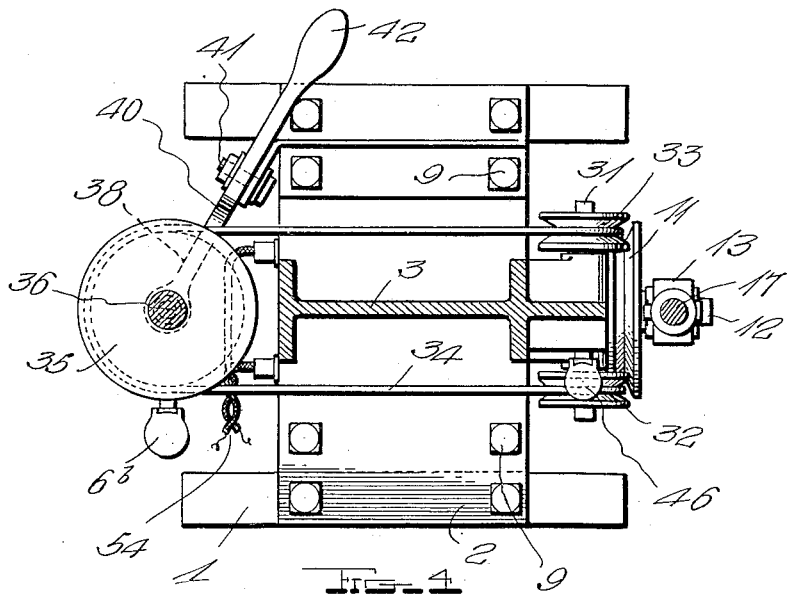

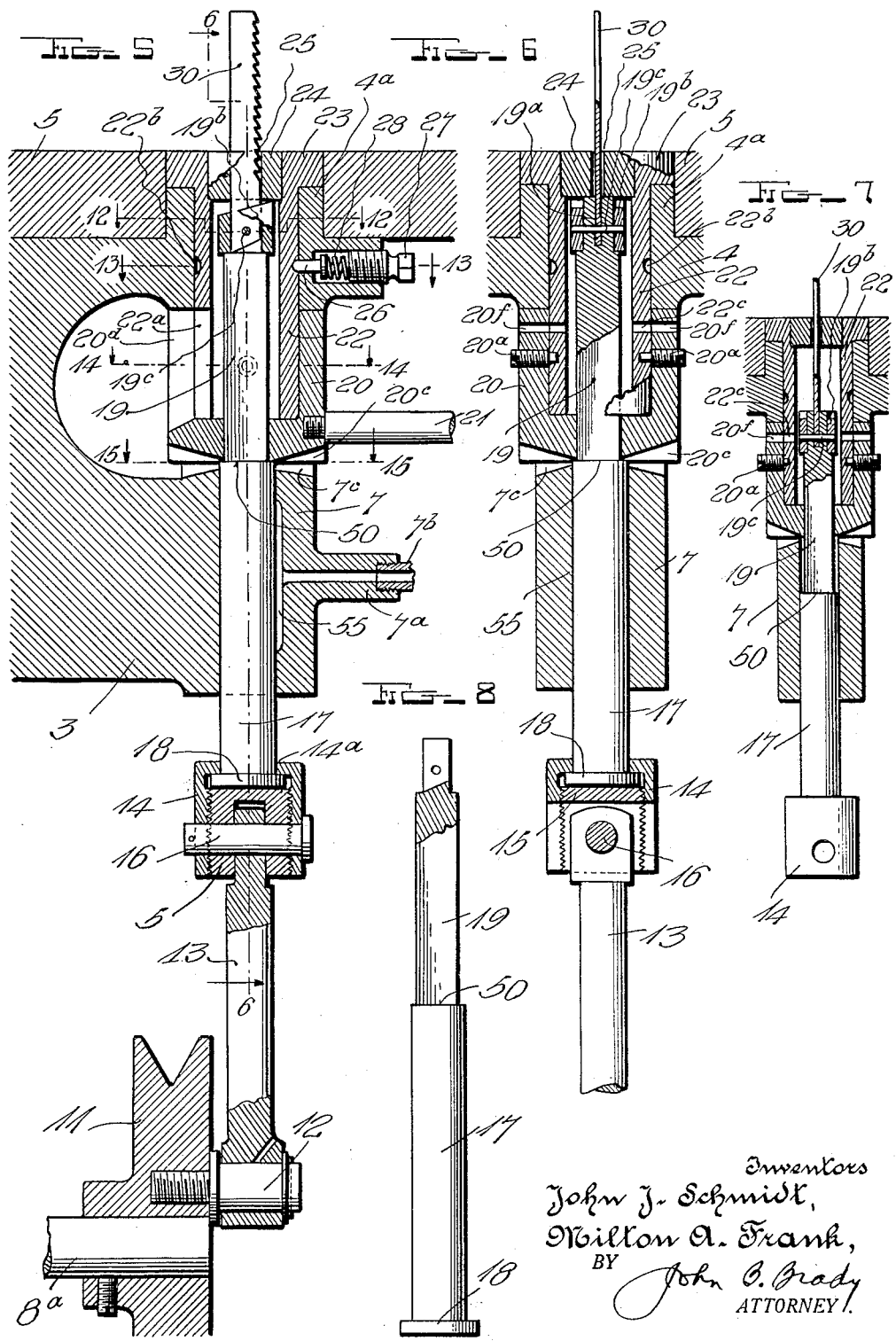

Jan. 12, 1932.   J. J. SCHMIDT ET AL   1,840,533
POWER SAW AND DRILL
Filed Aug. 5, 1930   4 Sheets-Sheet 4
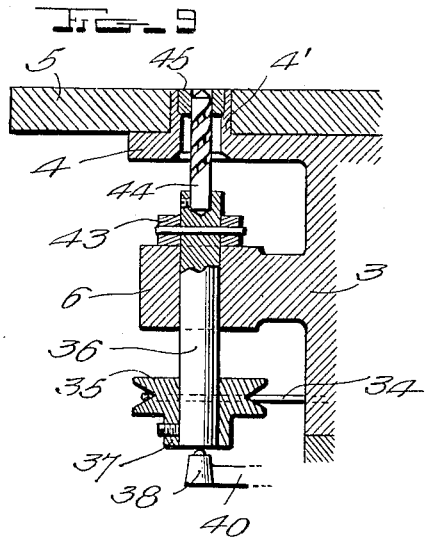
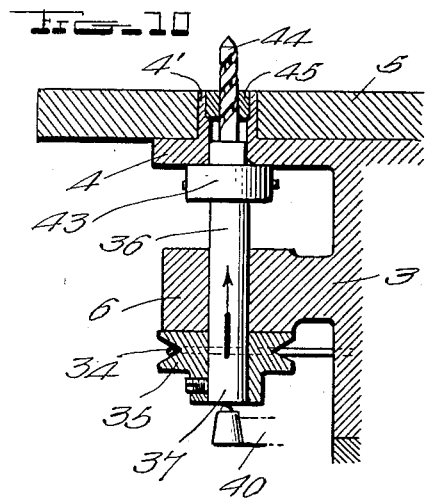
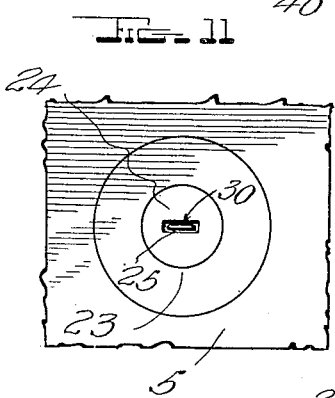
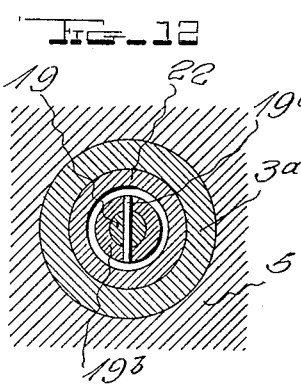
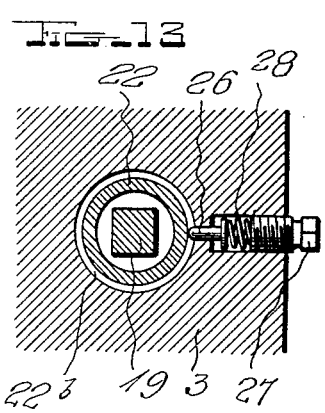
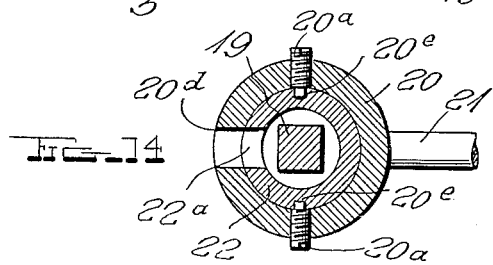
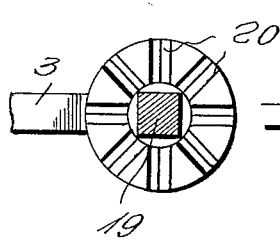
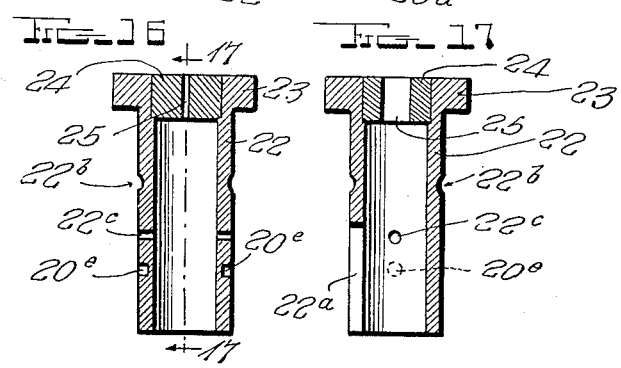
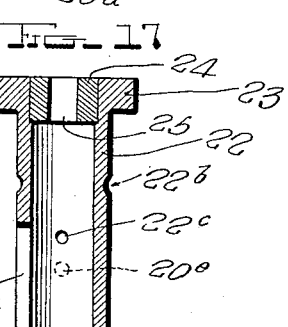
Inventors
John J. Schmidt,
Milton A. Frank,
BY John O Grady
ATTORNEY.

Patented Jan. 12, 1932

1,840,533

UNITED STATES PATENT OFFICE

JOHN J. SCHMIDT AND MILTON A. FRANK, OF FREDERICK, MARYLAND, ASSIGNORS TO THE FREDERICK IRON & STEEL COMPANY, OF FREDERICK, MARYLAND, A CORPORATION OF MARYLAND

POWER SAW AND DRILL

Application filed August 5, 1930. Serial No. 473,172.

Our invention relates broadly to mill working apparatus and more particularly to a power driven saw and drill.

One of the objects of our invention is to provide a construction of hollow driven saw and drill particularly adapted for operation upon composition board, plaster board, laminated sheet, wall board, beaver board, upson board, celotex, matex, and other forms of sheet material.

Another object of our invention is to provide a construction of power saw in which a reciprocatory saw member may be operated through a table support for cutting board material by means of short reciprocatory strokes free of overhead obstructions encountered in scroll and band saws.

A further object of our invention is to provide a drive mechanism for a power saw whereby reciprocatory strokes may be imparted to a saw blade, which saw blade is mounted in such manner that the blade may be manually oriented in effecting a desired cutting operation.

A still further object of our invention is to provide a portable mounting means for a combination power driven drill and saw where manually operative means are provided for moving the drill and orienting the saw for effecting the required cutting operations.

Another object of our invention is to provide an arrangement of mounting for a reciprocatory power driven saw where collection of sawdust and foreign matter around the saw blade tending to interfere with the operation of the blade is substantially prevented.

Still another object of our invention is to provide means for readily removing and replacing the blade of a reciprocatory saw member without disassembly of the drive mechanism.

Other and further objects of our invention reside in the construction and compact assembly of a portable power saw and drill as set forth more fully in the specification hereinafter following by reference to the accompanying drawings, in which:

Figure 1 is a side elevation of the improved power saw; Fig. 2 is an end elevation; Fig. 3 is a horizontal sectional view on line 3—3 of Fig. 1; Fig. 4 is a similar view taken on line 4—4 of Fig. 1; Fig. 5 is a central vertical longitudinal sectional view on an enlarged scale showing more particularly the saw operating and locking means; Fig. 6 is a transverse vertical sectional view on line 6—6 of Fig. 5; Fig. 7 is a similar view on a somewhat smaller scale showing the method of removing or replacing a different saw blade; Fig. 8 is a detail of the saw operating plunger; Fig. 9 is a detailed vertical sectional view on line 9—9 of Fig. 3 showing the drill in its normal or lowered position; Fig. 10 is a similar view showing the drill in a raised position; Fig. 11 is a detailed plan view of the saw blade and adjacent parts; Figs. 12, 13, 14 and 15 are horizontal sectional views taken on the correspondingly designated lines of Fig. 5; and Figs. 16 and 17 respectively are detailed sectional views of the sleeve member used in connection with the saw blade operating means.

Heretofore in the art portable saws of the circular disc type have been provided but such saws are not adapted for cutting out flat work in a multiplicity of variable curves. The field of operation of the rotary disc saw is substantially limited to longitudinal ripping and lateral cross cut operations. Our portable power saw and drill has been designed for the particular purpose of permitting flat cutouts to be rapidly and accurately made. The power saw and drill of our invention is particularly adapted for cutting out ornamental figures in flat material of the classes hereinbefore mentioned. Our saw and drill is particularly useful in the forming of ornamental and artistic figures employed in advertising signs and display posters. By reason of the fact that the reciprocatory saw member forming the cutting element for our portable apparatus is free to cut flat material without obstruction from an overhead support such as has been heretofore encountered in bandsaws and scroll saws, we are enabled to perform a cutting operation more accurately and quickly. To assist in effecting cutting operations, the power driven drill in the apparatus of our invention is utilized for perforating the flat material on which operations are to be performed, thereby shortening the work of the reciprocatory saw blade. We provide a special form of orienting means for the reciprocatory saw enabling the cutting blade to be shifted to various angular positions while being driven under reciprocatory forces for effecting a cutting operation.

Referring to the drawings in detail, reference character 1 designates a portable frame structure on which the parts of the power saw and drill are mounted. A laterally extending supporting plate 2 is carried by the frame structure 1 and provides a mounting for the central support shown at 3. The support 3 includes a central longitudinally extending web which is extended at one end as illustrated at 6 for guiding the drill portion of the apparatus and projects at the other end as shown at 7 for guiding the saw portion of the apparatus. A drive motor 8 is suspended from the frame of the apparatus by means of bolt members 9 and serves to drive a central shaft 8a carrying a drive pulley 11 to which there is secured the projecting pin 12 adapted to impart motion to pitman 13 for reciprocating the vertical movable member 17. The pitman 13 is apertured to receive a pin 16 through the upper portion thereof which pin anchors the crank 13 through the plug member 15 and through the screw threaded sleeve member 14. The sleeve member 14 is apertured at 14a for the passage of member 17 therethrough, which member is provided with an annular head 18 by which member 17 is confined in position between plug 15 and sleeve 14. Member 17 reciprocates within the vertically disposed bore 55 of the extension 7 on web portion 3. The reciprocatory member 17 is provided with a shoulder 50. The upper portion of the reciprocatory member 17 is square in cross-section as shown at 19 which portion is reciprocatory within the interior of the sleeve 22. The upper extremity of the square portion 19 of reciprocatory member 17 is bifurcated as represented at 19a. The saw blade shown at 30 fits into the bifurcated portion of the reciprocatory member and is pinned in position by means of the pin 19c which passes through aperture 19d, laterally through the reciprocatory member, through the blade 30, and through opposite sides of the ferrule member 19b. It will be observed that ferrule member 19b is provided with an upper angularly disposed peripheral edge for the purpose of discharging sawdust or finely divided particles discharged from the material which is being operated upon, during the reciprocatory movement of the saw blade 30.

The saw blade 30 passes through slot 25 in ferrule member 24 which is seated within the cylindrical member 23 which terminates flush with the top of the work platform 5. The cylindrical member 23 connects with the depending tubular portion 22 which surrounds the reciprocatory member 19 and is slotted at one side as represented at 22a to permit the rapid discharge of sawdust or finely divided particles, out through the aperture 20d in the orienting member 20 and through the apertured portion 7d of the extension 7. The tubular member 22 is provided with an annular recess 22b into which the spring pressed pin 26 is adapted to be projected under pressure of spring 28 and under control of the screw plug 27. The cylindrical member 23 is removable by withdrawing pin 19c and retracting screw members 20a out of engagement with the oppositely disposed sockets 20e in the tubular member 22. The orienting member 20 and the tubular member 22 are provided with aligned apertures represented at 20f and 22c by which the pin 19c may be inserted or ejected in securing the saw blade 30 in position in the end of the reciprocatory member. That is, when it is desired to eject the pin 19c for renewing the saw blade 30 the orienting means 20 is revolved to a position where apertures 20f and 22c are aligned laterally with respect to the pin and thereafter the pin may be struck out by an ejecting tool moved against the end of the pin. The orienting member 20 is provided with an operating handle 21 by which the rectangular portion 19 of reciprocatory member 17 may be angularly moved to the desired position for effecting a cutting operation by the reciprocatory blade 30 in a desired direction.

In order to provide for the discharge of sawdust or fine dust particles, radially cut recesses 7c and 20c are provided in the projecting member 7 and orienting member 20. In order to provide for continuous lubrication of the reciprocatory member 17 may be maintained by feeding lubricant through oil cup 7b and lubricant passage 7a to the bore in extension 3 through which the reciprocatory member 17 passes. The drill is shown at 44 at the opposite end of the work platform 5. The extension 4 from web member 3 has an upwardly projecting portion 4' over which work platform 5 is mounted as shown in Figs. 9 and 10. A ferrule 45 is seated in the projecting portion 4' through which drill 44 may be pressed upwardly for effecting a drilling operation. The drill 44 is carried in the end of rotatable shaft 36 which is vertically movable through extension 6 on web portion 3. A ring member 43 is secured to shaft 36 and limits the downward movement of shaft 36 by the contact of ring member 43 with projection 6 while also limiting the upward movement of shaft 36 by contact of ring member 43 with the under face of the portion 4 which projects from the web portion 3. The shaft 36 has a pulley 35 keyed thereto which pulley is rotatably driven by means of belt 34, which belt passes over pulleys 32 and 33 and is driven from pulley 11 which is in turn driven from motor 8. Drill 44 is pressed upwardly for effecting a drilling operation under control of a hand lever illustrated in Figs. 3 and 4 at 40. The hand lever 40 is pivotally mounted at 41 on the portable frame structure of the apparatus and is provided with a hand grip indicated at 42 by which the shaft 36 may be pressed upwardly through the engagement of the end 38 of lever 40 with the end of the rotatable shaft 36. In order to maintain the operation of shaft 36 under conditions of good lubrication, an oil cup 6b is connected at 6a with the projection 6 and serves to feed lubricant around the rotatable shaft 36 throughout the period of operation of the drill.

The guide pulleys 32 and 33 are carried upon a laterally extending shaft 31 which is journalled in the frame structure as indicated at 53. Oil cup 46 continuously feeds lubricant to the rotatable shaft 31 thereby insuring smooth operation of the power saw and drill. The circuit to the driving motor 8 is indicated at 54. The driving motor is placed in operation and the drill 44 advanced or retracted through the work on the work platform 25. The saw 30 is readily oriented during the reciprocatory movement thereof by shifting control handle 21 to any one of the dotted line positions represented in Fig. 3 at 21a or 21b. The entire cylindrical member 23 and seat 24 are shifted to selected angular positions by movement of the orienting member 20, for as heretofore pointed out the screw members 20 enter recesses 20e in sleeve 22 and bind the several members together as a unit.

The assembly and disassembly of the parts of the saw has been rendered as simple as possible. The pin 16 in the lower part of member 14 may be removed in effecting assembly or disassembly. The pitman 13 is fastened by pin 12 to driving pulley 11 and is unfastened by withdrawing the cotterpin holding pin 16 normally in place. Pitman 13 is then left hanging downwardly pivoted at 12. Then without disturbing any of the assembly, 17 is sufficiently lowered until pin 19c is in alignment with 20c and 20f. Then an appropriate tool or nail punch is inserted and the pin 19c laterally removed through the aforementioned holes. The tool is then ready for the insertion of a new saw blade. An unskilled operator may thus change saw blades with the minimum of time lost for shut down of the machine. On building jobs or rush work this is an important and time saving feature for the contractor.

The apparatus of our invention is particularly adapted for forming artistic cut-outs in flat sheet-like material. For example fiber board, plaster board, wall board, celotex, or insulite, are relatively tough in their texture and yet large size sheets of this material may very readily be placed upon the work supporting table 5 and the reciprocatory saw 30 shifted to different angular positions for effecting a desired cut-out. Where it is difficult for the saw to enter small gaps we may use the rotating drill for perforating the flat sheet material. In this way the drill and reciprocatory saw are cooperatively related and are used in a combined sense in the preparation of cut-outs from flat sheet material.

We have found the saw and drill apparatus of our invention highly practical in its construction and manufacture and highly successful and efficient in its use. While we have described our invention in one of its preferred embodiments, we desire that it be understood that modifications may be made and that no limitations upon the invention are intended other than are imposed by the scope of the appended claims.

What we claim as new and desire to secure by Letters Patent of the United States is as follows:

1. A combined power saw and drill comprising a frame structure, a driving motor supported by said frame structure, a work platform carried by said frame structure in a position above said driving motor, a rotary drill mounted adjacent one end of said frame structure, a reciprocatory saw mounted adjacent the opposite end of said frame structure, means extending laterally beneath said work platform and slidably embracing said reciprocatory saw for orienting said saw with respect to said work platform, and means connected with said driving motor for simultaneously actuating said saw and drill.

2. In a combined power saw and drill, a frame structure, a driving motor supported from said frame structure, a drill mounted adjacent one end of said frame structure, a reciprocatory member mounted adjacent the opposite end of said frame structure, a saw blade carried by the upper extremity of said member, a work platform supported by said frame structure, means for manually shifting said drill in a vertical direction through said work platform, means connected with said motor for simultaneously imparting rotary motion to said drill and a reciprocatory motion to said saw, and means slidably embracing said reciprocatory member for imparting angular movement thereto for orienting the position of said saw blade with respect to said work platform.

3. A combined power saw and drill comprising a frame structure, a driving motor depending from said frame structure, a work platform carried by said frame structure and extending over said driving motor, sleeve members integrally supported on opposite ends of said frame structure, a rotary drill journalled in one of said sleeve members, a reciprocatory saw extending vertically through the other of said sleeve members, means connected with said motor for simultaneously imparting rotary motion to said drill and reciprocatory motion to said saw, and means projecting from the sleeve member which surrounds said reciprocatory saw for imparting angular movement to said reciprocatory saw with respect to said work platform.

4. A combined saw and drill comprising a frame structure, a driving motor supported by said frame structure, a work platform carried by said frame structure and extending over said driving motor, a sleeve member extending from each end of said frame structure, a rotary drill journalled in one of said sleeve members, means on said frame structure for manually shifting said rotary drill vertically through said work platform, a reciprocatory saw axially mounted in the other of said sleeve members, means interconnecting said driving motor with said rotatable drill and with said reciprocatory saw for simultaneously imparting rotary motion to said drill and reciprocatory motion to said saw, and means connected with the sleeve member which surrounds said saw for imparting angular movement thereto and orienting the plane of said saw with respect to said work platform.

5. A combined power saw and drill comprising a frame structure, a driving motor suspended from said frame structure with its shaft substantially horizontal, projections on each end of said frame structure, a work platform carried by said frame structure and extending over each of said projections, a rotatable drill journalled in one of said projections, a reciprocatory member extending axially through the other of said projections, a saw blade carried by said member, means interconnecting said driving motor with said reciprocatory member for imparting reciprocatory motion thereto, a belt interconnecting said driving motor with said rotatable drill for imparting rotatable motion thereto, and means slidably embracing said reciprocatory member for imparting angular movement thereto and orienting said saw blade with respect to said work platform.

6. A power saw comprising a frame structure, a drive motor carried by said frame structure, a work platform supported by said frame structure and extending over said drive motor, a projection extending from one end of said frame structure and forming a guide for a reciprocatory member shiftable therethrough in a substantially vertical position, a pitman interconnecting said member with said drive motor for imparting reciprocatory motion thereto, a saw carried by the upper extremity of said member and projectable in successive strokes through said work platform under control of said driving motor, and a laterally extending lever having a hub portion thereon embracing said reciprocatory member for orienting said saw with respect to said work platform.

7. A power saw comprising a frame structure, a driving motor carried by said frame structure and having the drive shaft thereof extending in a substantially horizontal direction, a work platform carried by said frame structure, a projection connected with one side of said frame structure and extending beneath said work platform, a reciprocatory member extending through said projection, means for imparting motion to said reciprocatory member from said drive shaft in a substantially vertical direction, a saw blade connected with one end of said member and projectable through said work platform for operating upon work carried thereupon, and means extending laterally beneath said work platform and embracing said reciprocatory member for angularly shifting said member and selectively orienting said saw blade with respect to said work platform.

8. A power saw comprising a frame structure, a driving motor carried by said frame structure and having the drive shaft thereof extending in a substantially horizontal direction, a work platform carried by said frame structure, a projection connected with one side of said frame structure and extending beneath said work platform, a reciprocatory member extending through said projection, means for imparting motion to said reciprocatory member from said drive shaft in a substantially vertical direction, a saw blade connected with one end of said member and projectable through said work platform, and means for orienting said saw blade for controlling the direction of cut thereof independently of the reciprocatory movement of said saw blade.

9. A power saw comprising a frame structure, a driving motor carried by said frame structure and having the drive shaft thereof extending in a substantially horizontal direction, a work platform carried by said frame structure, a projection connected with one side of said frame structure and extending beneath said work platform, a reciprocatory member extending through said projection, means for imparting motion to said reciprocatory member from said drive shaft in a substantially vertical direction, a saw blade connected with one end of said member and projectable through said work platform, and means disposed above said projection for orienting said saw blade for changing the direction of cut thereof independently of the reciprocatory motion of said saw blade.

10. A power saw comprising a frame structure, a driving motor carried by said frame structure and having the drive shaft thereof extending in a substantially horizontal direction, a work platform carried by said frame structure, a projection connected with one side of said frame structure and extending beneath said work platform, a reciprocatory member extending through said projection, means for imparting motion to said reciprocatory member from said drive shaft in a substantially vertical direction, a saw blade connected with one end of said member and projectable through said work platform, and a sleeve member engageable with said aforesaid member and angularly shiftable through a distance of substantially 180° for orienting said saw blade and controlling the direction of cut thereof independently of the reciprocatory movement imparted to said saw blade.

11. A power saw comprising a frame structure, a driving motor carried by said frame structure and having the drive shaft thereof extending in a substantially horizontal direction, a work platform carried by said frame structure, a projection connected with one side of said frame structure and extending beneath said work platform, a reciprocatory member extending through said projection, means for imparting motion to said reciprocatory member from said drive shaft in a substantially vertical direction, a saw blade connected with one end of said member and projectable though said work platform, and a tubular member substantially enclosing a portion of said aforesaid member, said tubular member being angularly shiftable through a distance of substantially 180° for orienting said saw blade and controlling the direction of cut thereof independently of the reciprocatory motion imparted to said saw blade.

12. A power saw comprising a frame structure, a driving motor carried by said frame structure and having the drive shaft thereof extending in a substantially horizontal direction, a work platform carried by said frame structure, a projection connected with one side of said frame structure and extending beneath said work platform, a reciprocatory member extending through said projection, means for imparting motion to said reciprocatory member from said drive shaft in a substantially vertical direction, a saw blade connected with one end of said member and projectable through said work platform, and a tubular member substantially surrounding said aforesaid member, said tubular member having a discharge orifice at one side thereof for the discharge of sawed particles, means for angularly shifting said tubular member to substantially 180° for orienting said saw blade and controlling the direction of cut thereof independently of the reciprocatory movement imparted to said saw blade.

13. A power saw comprising a frame structure, a driving motor carried by said frame structure, a work platform supported by said frame structure and extending over said driving motor, a projection on said frame structure extending to a position beneath said work platform, a reciprocatory member mounted in said projection for vertical movement, a pitman interconnecting the lower end of said member with said drive motor for imparting reciprocatory movement to said member, the upper end of said member being bifurcated, and a saw blade insertable into the bifurcated end of said member, said saw blade being reciprocative through said work platform in accordance with forces delivered from said pitman.

14. A power saw comprising a frame structure, a driving motor supported by said frame structure, a work platform carried by said frame structure, a projection extending from said frame structure to a position beneath said work platform, a reciprocatory member in said projection, means interconnecting the lower extremity of said reciprocatory member with said driving motor for imparting reciprocatory movement to said reciprocatory member, the upper extremity of said reciprocatory member being bifurcated for receiving a saw blade, and means surrounding said reciprocatory member for orienting the position of said saw blade independently of reciprocatory movement thereof through said work platform.

15. A power saw comprising a frame structure, a driving motor supported by said frame structure, a work platform carried by said frame structure, a projection extending from said frame structure to a position beneath said work platform, a reciprocatory member in said projection, means interconnecting the lower extremity of said reciprocatory member with said driving motor for imparting reciprocatory movement to said reciprocatory member, the upper extremity of said reciprocatory member being bifurcated for receiving a saw blade, tubular means surrounding said reciprocatory member, said tubular means having diametrically extending apertures therethrough for the insertion or ejection of a pin binding said saw blade in the bifurcated end of said reciprocatory member.

16. A power saw comprising a frame structure, a driving motor supported by said frame structure, a work platform carried by said frame structure, a projection extending from said frame structure to a position beneath said work platform, a reciprocatory member in said projection, means interconnecting the lower extremity of said reciprocatory member with said driving motor for imparting reciprocatory movement to said reciprocatory member, the upper extremity of said reciprocatory member being bifurcated for receiving a saw blade, and a pair of tubular members surrounding said reciprocatory member and nested one within the other, each of said tubular members having discharge ports aligned at one side thereof for the ejection of sawed particles, and means for angularly shifting said tubular members for orienting said saw blade and controlling the direction of cut of said saw blade with respect to the work on said work platform independently of the reciprocatory movement of said saw blade.

17. A power saw comprising a frame structure, a driving motor supported by said frame structure, a work platform carried by said frame structure, a projection extending from said frame structure to a position beneath said work platform, a reciprocatory member in said projection, means interconnecting the lower extremity of said reciprocatory member with said driving motor for imparting reciprocatory movement to said reciprocatory member, the upper extremity of said reciprocatory member being bifurcated for receiving a saw blade, a pair of concentrically related tubular members surrounding said reciprocatory member, the outer tubular member having means extending therethrough and into the inner tubular member, aligned apertures in each of said tubular members for permitting the insertion or ejection of a pin through the bifurcated end of said reciprocatory member for binding or removing said saw blade therefrom and means for angularly shifting said tubular members for orienting said saw and controlling the direction of cut thereof independently of reciprocatory movement imparted thereto.

In testimony whereof we affix our signatures.

JOHN J. SCHMIDT.
MILTON A. FRANK.